United States Patent [19]

Allison

[11] 4,046,402
[45] Sept. 6, 1977

[54] BALL JOINT SUSPENSION FOR A MOTOR VEHICLE

[75] Inventor: William D. Allison, Grosse Pointe Farms, Mich.

[73] Assignee: Ford Motor Company, Dearborn, Mich.

[21] Appl. No.: 593,802

[22] Filed: July 7, 1975

[51] Int. Cl.² .......................................... B60G 11/18
[52] U.S. Cl. ................................. 280/674; 267/57; 280/700
[58] Field of Search .............. 280/673, 674, 675, 664, 280/668, 695, 700, 721; 267/57, 154

[56] References Cited

U.S. PATENT DOCUMENTS

| 377,817 | 2/1888 | Swan | 267/57 |
|---|---|---|---|
| 2,856,198 | 10/1958 | Muller | 280/674 |
| 2,915,321 | 12/1959 | Wilfert | 280/721 |
| 3,620,548 | 11/1971 | Winsen | 280/674 |
| 3,650,540 | 3/1972 | Verley | 280/721 |
| 3,658,312 | 4/1972 | Scheublein | 267/57 |
| 3,726,539 | 4/1973 | Nicholls | 280/673 |
| 3,850,443 | 11/1974 | Hassan | 280/674 |

FOREIGN PATENT DOCUMENTS

| 1,241,657 | 8/1960 | France | 280/674 |
|---|---|---|---|
| 895,475 | 5/1962 | United Kingdom | 280/695 |
| 987,670 | 3/1965 | United Kingdom | 280/668 |

Primary Examiner—Joseph F. Peters, Jr.
Assistant Examiner—John A. Carroll
Attorney, Agent, or Firm—Clifford L. Sadler; Keith L. Zerschling

[57] ABSTRACT

A ball joint suspension for a motor vehicle is disclosed. A torsion bar spring has laterally extending left and right wheel positioning portions of generally Y-shape. The outer ends of these portions each comprise parallel bars that are interconnected by a small loop. A ball joint has its socket press-fitted into the small loop and its ball stud secured to a wheel support member.

4 Claims, 5 Drawing Figures

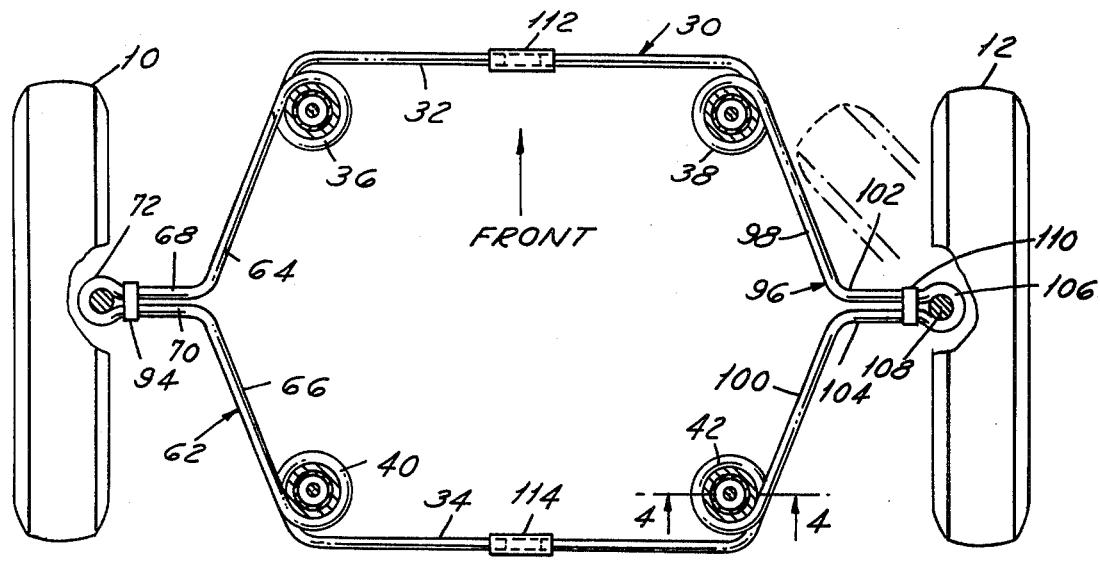
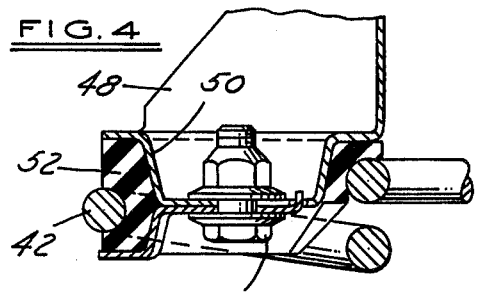
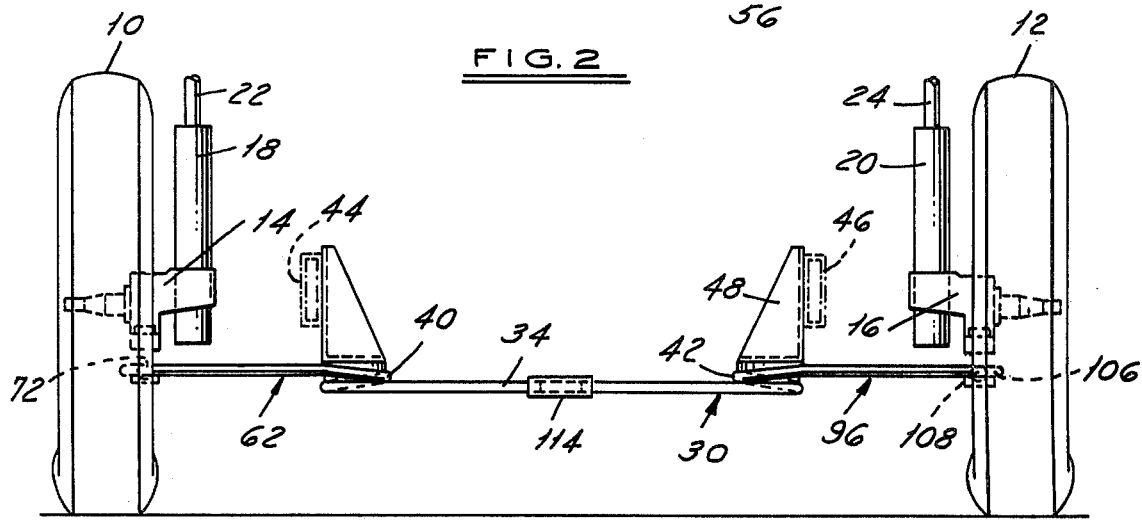

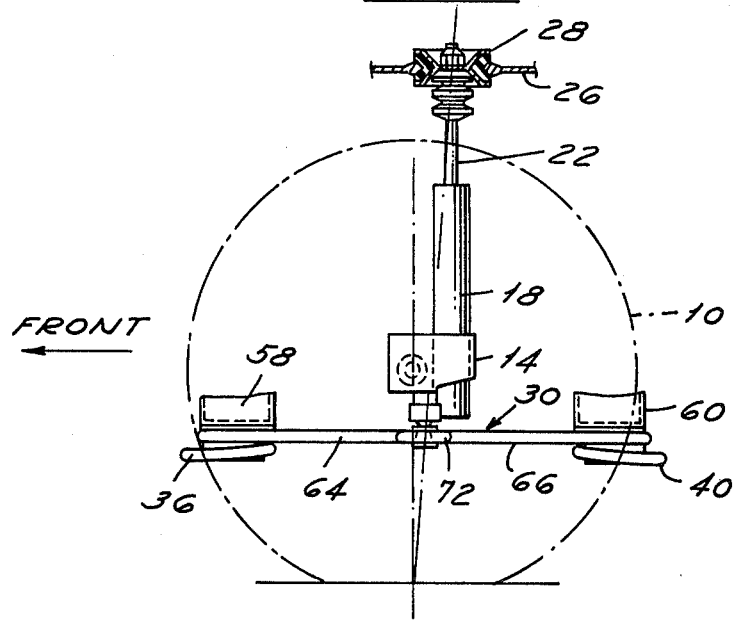
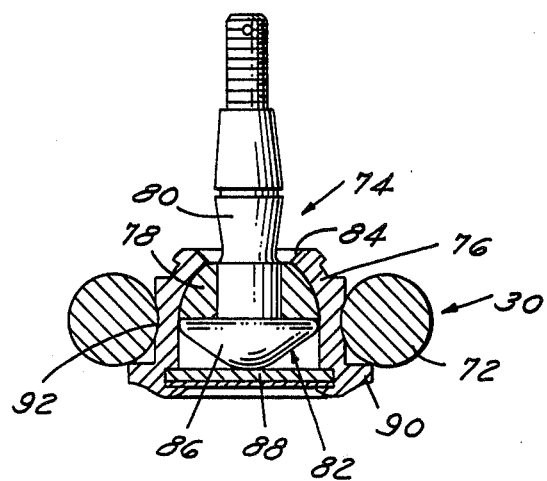

BALL JOINT SUSPENSION FOR A MOTOR VEHICLE

BACKGROUND OF THE DISCLOSURE

The present invention relates to independent front suspension systems for motor vehicles, and more particularly to ball joint suspensions. In accordance with the present disclosure a torsion bar spring has a wheel positioning portion that functions as a suspension arm and a ball joint connects that bar portion to a wheel support member.

BRIEF SUMMARY OF THE DISCLOSURE

In a presently preferred embodiment of this invention, an independent front suspension system for a motor vehicle has a single continuous torsion bar spring that is formed into the shape of a closed figure. The bar has first and second transverse portions that are situated fore and aft the axis of rotation of the left and right front wheels. The torsion bar has single loops or coils at each of the ends of the transverse portions and these loops are connected to the vehicle frame by resilient devices.

A generally Y-shape torsion bar portion connects the loops at the right ends of the transverse bar portions with the right wheel support member. In a similar fashion, a generally Y-shape left bar portion connects the bar loops at the left ends of the transverse portions with the left wheel support member. The left and right Y-shape portions of the torsion bar constitute wheel positioning members in the suspension system.

The left and right outer ends of the torsion bar spring are each formed with a small loop. The sockets of left and right ball joints are press-fitted into these loops. The shank of the ball stud portions of the joints are secured to the left and right wheel support members.

In the illustrated embodiment of the invention, left and right telescopic shock absorbers have their lower ends rigidly secured to the wheel support members and their upper ends connected to vehicle body structure.

An independent suspension system for a motor vehicle in accordance with this invention is characterized by its simplicity of construction and economy of manufacture. It is particularly well suited to light-weight vehicles.

BRIEF DESCRIPTION OF THE DRAWINGS

The many objects and advantages of an independent suspension system for a motor vehicle constructed in accordance with this invention will become apparent upon consideration of the following detailed discussion and the accompanying drawings, in which:

FIG. 1 is a top plan view of an independent suspension system for a motor vehicle;

FIG. 2 is a rear elevational view of the vehicle suspension of FIG. 1;

FIG. 3 is a side elevational view of the left side of the suspension of FIG. 1;

FIG. 4 is a sectional view, taken along section line 4—4 of FIG. 1, disclosing the connection between the torsion bar spring and the vehicle frame; and FIG. 5 is a sectional view of the ball joint connecting the torsion bar spring to the wheel support member of the suspension system.

DETAILED DESCRIPTION OF A PREFERRED EMBODIMENT

Referring now to the drawings, wherein a preferred embodiment of an independent front suspension system for a motor vehicle is disclosed, left and right road wheels 10 and 12 are rotatably supported on left and right wheel support members 14 and 16. Left and right telescopic shock absorbers or suspension struts 18 and 20 have their lower ends rigidly secured to the wheel support members 14 and 16. Piston rods 22 and 24 extend upwardly from the struts 18 and 20. As seen in FIG. 3, the upper end of the piston rod 22 is secured to vehicle body structure 26 by means of a resilient connector 28. The piston rod 24 is connected to the vehicle body structure in a similar manner.

A continuous torsion bar spring 30 that is formed into the shape of a closed figure is connected to the vehicle body and to the left and right wheel support members 14 and 16. The torsion bar 30 has transverse portions 32 and 34 that are spaced fore and aft, respectively, of the axis of rotation of the wheels 10 and 12. The torsion bar 30 is provided with a single loop or coil at each of the outer ends of the transverse bar portions 32 and 34. Single coils 36 and 38 are located at the outer ends of the forward transverse portion 32 and single coils 40 and 42 are located at the left and right ends of the rearward transverse portion 34.

Each of the coils 36, 38, 40 and 42 is connected to the vehicle body. The vehicle body structure includes left and right frame side rails 44 and 46. Resilient means are provided for connecting the left coils 36 and 40 to the left frame rail 44. Similarly, a resilient means is provided to connect each of the right torsion bar coils 38 and 42 to the right frame side rail 46. The construction of one of these resilient connections is shown in FIG. 4.

A spring seat 48 is welded to the right frame side rail 46 and has a frusto-conical portion 50. An annular rubber element 52 is positioned within the center of the coil 42 and has a circumferential groove to receive the coil. The rubber element 52 engages the spring seat 48 and its frusto-conical wall 50. A sheet metal retaining plate 54, having a configuration as shown in the drawings, engages the rubber element 52 and is secured to the spring seat 48 by a bolt 56.

The left frame side rail 44 has fore and aft spring seats 58 and 60 welded to it that are constructed similar to the spring seat 48 of FIG. 4. The fore and aft loops 36 and 40 of the torsion bar 30 are secured to the spring seats 58 and 60 by resilient devices of the type shown in FIG. 4.

A generally Y-shape portion 62 of the bar 30 connects the fore and aft spring loops 36 and 40 to the left wheel support member 14. The Y-shape portion 62 has a forward diagonally arranged strut portion 64 and a rearward diagonally arranged strut portion 66. The left extremity of the bar 30 has parallel portions 68 and 70 connected to the strut portions 64 and 66 which terminate in a small loop 72.

A ball and socket joint 74 connects the small loop 72 at the left end of the bar 30 to the left wheel support member 14. The joint 74 includes a socket portion 76 in which an annular bearing 78 is pivotally supported. The shank 80 of a stud 82 extends through an opening 84 in the socket 76. The head 86 of the stud 82 rests against the bearing 78. The shank 80 of the stud 82 is constructed to be secured to the wheel support member 14. The interior of the socket 76 is closed by a closure plate 88 that is engaged by a crimped over edge of the socket.

The ball joint socket 76 has a ledge or radially extending flange 90 that protrudes from its lower end outwardly of the closure plate 88. Spaced upwardly from the flange 90 is an annular recess 92. The ball joint assembly 78 is forced through the loop 72 in the torsion bar spring 30 until it engages the ledge 90 and is seated in the recess 92. The ball joint socket 76 is held in place by a press fit. The prevailing forces exerted by the bar 30 in its function as a main suspension spring are in a downward direction against the ledge 90 and, therefore, the ball joint assembly 74 is held securely against accidental dislodgement. As an additional securing feature, a metal band 94 (see FIG. 1) may be strapped around the laterally extending portions 68 and 70 of the torsion bar 30 adjacent to the socket 76. The band 94 reinforces the loop 72 in its gripping engagement with the socket 76.

In a similar fashion, a generally Y-shape portion 96 of the torsion bar 30 has diagonal strut portions 98 and 100 connected to the fore and aft spring loops 38 and 42. The Y-shape portion 96, at the right side of the spring 30, has laterally extending portions 102 and 104 which terminate in a small loop 106. The socket of the ball joint assembly 108 is press-fitted into the loop 106. A strap 110 serves to lock the ball joint 108 in position. The ball joint assembly 108 provides an articulated connection between the torsion bar 30 and the right wheel support member 16.

The spring 30 may be fabricated in left and right halves as illustrated in FIG. 1. These spring halves are identical and interchangeable. The spring halves have ends that are fitted into fore and aft sleeves 112 and 114 where they are welded securely in place so that the torsion bar 30 is fabricated to form a single continuous spring bar of closed configuration.

SUMMARY

An independent front suspension system in accordance with this invention is of uncomplicated construction and is economical to manufacture. The torsion bar spring 30 is a single continuous spring formed in the shape of a closed figure that interconnects the left and right wheel support members 14, 16 and is supported on the vehicle frame 44, 46 at four spaced apart points. The torsion bar 30 functions as a main suspension spring, as left and right suspension arms for positioning the wheel support members and as an anti-roll stabilizer. In a unique manner, the left and right portions 62 and 96 of the bar 30 which form the suspension arms are securely locked to the left and right ball joints 72 and 108 by means of press fits.

The foregoing description presents the presently preferred embodiment of this invention. Modifications and alterations may occur to those skilled in the art that will come within the scope and spirit of the following claims.

I claim:

1. A ball joint suspension for a motor vehicle having a vehicle frame;
   a wheel positioning member connected to said vehicle frame;
   a wheel support member constructed to rotatably support a road wheel;
   said wheel positioning member having fore and aft branch portions connected to said vehicle frame and a laterally extending portion comprising parallel rods that are interconnected at their outer ends by a loop;
   said loop defining a small opening in which the socket of a ball joint is secured by a press fit;
   reinforcing means engaging said parallel rods adjacent said loop;
   said joint having a stud connected to said wheel support member.

2. A ball joint suspension for a motor vehicle having a vehicle frame;
   a wheel positioning member connected to said vehicle frame;
   a wheel support member constructed to rotatably support a road wheel;
   said wheel positioning member having fore and aft branch portions connected to said vehicle frame and a laterally extending portion comprising parallel rods that are interconnected at their outer ends by a loop,
   said loop defining a small opening in which the socket of a ball joint is secured by a press fit;
   said socket having a ledge portion in engagement with said loop;
   reinforcing means engaging said parallel rods adjacent said loop;
   said joint having a stud connected to said wheel support member.

3. A ball joint suspension for a motor vehicle having a vehicle frame;
   a road wheel rotatably supported by a wheel support member;
   a wheel positioning member connected to said vehicle frame;
   said wheel positioning member comprising a rodlike construction with a generally Y-shape;
   said wheel positioning member having fore and aft strut portions connected to said vehicle frame;
   said wheel positioning member having a laterally extending portion comprising parallel rods that are interconnected at their outer ends by an integral loop;
   said loop defining a small opening;
   a ball and socket joint having a socket positioned in said opening and in press fit engagement with said loop;
   reinforcing means engaging said parallel rods adjacent said loop;
   said joint having a stud connected to said wheel support member.

4. A ball joint suspension for a motor vehicle having a vehicle frame;
   a road wheel rotatably supported by a wheel support member;
   a wheel positioning member connected to said vehicle frame;
   said wheel positioning member comprising a rod-like construction with a generally Y-shape;
   said wheel positioning member having fore and aft strut portions connected to said vehicle frame;
   said wheel positioning member having a laterally extending portion comprising parallel rods that are interconnected at their outer ends by an integral loop;
   said loop defining a small opening;
   a ball and socket joint having a socket positioned in said opening and in press fit engagement with said loop;
   said socket having an annular exterior recess and a ledge spaced from said recess;
   said loop being seated in said recess and in engagement with said ledge;
   reinforcing means engaging said parallel rods adjacent said loop;
   said joint having a stud connected to said wheel support member.

* * * * *